(12) United States Patent
Peterson

(10) Patent No.: US 9,229,616 B2
(45) Date of Patent: Jan. 5, 2016

(54) METHODS AND SYSTEMS FOR ARRANGING MEDIA OBJECTS ON A DISPLAY SCREEN TO COMPENSATE FOR USER DISABILITIES

(71) Applicant: Rovi Guides, Inc., Santa Clara, CA (US)

(72) Inventor: Brian Peterson, Barrington, IL (US)

(73) Assignee: Rovi Guides, Inc., Santa Clara, CA (US)

( * ) Notice: Subject to any disclaimer, the term of this patent is extended or adjusted under 35 U.S.C. 154(b) by 134 days.

(21) Appl. No.: 13/903,365

(22) Filed: May 28, 2013

(65) Prior Publication Data

US 2014/0356848 A1   Dec. 4, 2014

(51) Int. Cl.
*G06F 3/0484* (2013.01)
*G06F 3/0482* (2013.01)
*G06Q 30/02* (2012.01)
*G09B 21/00* (2006.01)

(52) U.S. Cl.
CPC .......... *G06F 3/0482* (2013.01); *G06Q 30/0251* (2013.01); *G09B 21/00* (2013.01); *G09B 21/008* (2013.01)

(58) Field of Classification Search
CPC ......... G09G 5/00; G06F 3/048; G06F 3/0482; G06T 15/20; A61B 3/06; A61B 3/08; A61B 3/09; A61B 3/028; A61B 3/032; A61B 3/0091; G09B 19/00; G09B 21/00; G09B 21/001; H04N 13/00; H04N 13/0484; G06Q 30/0251; G06Q 30/0269
See application file for complete search history.

(56) References Cited

U.S. PATENT DOCUMENTS

| | | | |
|---|---|---|---|
| 6,239,794 B1 | 5/2001 | Yuen et al. |
| 6,388,714 B1 | 5/2002 | Schein et al. |
| 6,564,378 B1 | 5/2003 | Satterfield et al. |
| 6,756,997 B1 | 6/2004 | Ward, III et al. |
| 7,165,098 B1 | 1/2007 | Boyer et al. |
| 7,761,892 B2 | 7/2010 | Ellis et al. |
| 8,046,801 B2 | 10/2011 | Ellis et al. |
| 2002/0174430 A1 | 11/2002 | Ellis et al. |
| 2003/0110499 A1 | 6/2003 | Knudson et al. |
| 2005/0251827 A1 | 11/2005 | Ellis et al. |
| 2010/0153885 A1 | 6/2010 | Yates |

*Primary Examiner* — Timothy A Musselman
(74) *Attorney, Agent, or Firm* — Ropes & Gray LLP

(57) ABSTRACT

Methods and systems are disclosed herein for arranging media objects on a display screen to compensate for disabilities of a user. For example, if a media guidance application determines that, based on a particular disability, a user cannot see (or has limited vision with respect to) a portion of a screen displaying a media asset, the media guidance application alters the arrangement of media objects in the media asset to compensate for the disability.

18 Claims, 11 Drawing Sheets

720

METHODS AND SYSTEMS FOR ARRANGING MEDIA OBJECTS ON A DISPLAY SCREEN TO COMPENSATE FOR USER DISABILITIES

BACKGROUND

Media assets (e.g., movies, television programs, etc.) typically fill the entire screen of a display device during presentation. Consequently, if users have a disability (e.g., partial blindness, glaucoma, astigmatism, etc.), which results in an inability to see or focus on the entire screen, the ability of the user to enjoy and/or comprehend a media asset may be limited.

SUMMARY

Accordingly, methods and systems are disclosed herein for arranging media objects on a display screen to compensate for disabilities of a user. For example, if a media guidance application determines that, based on a particular disability, a user cannot perceive (or has limited vision with respect to) a portion of a display screen displaying a media asset, the media guidance application alters the arrangement of media objects in the media asset to a location that is not perceived as being distorted by the user with the disability. For example, the media guidance application may determine that a user has a blind spot in his/her vision. In order to compensate for the blind spot, the media guidance application may adjust media objects (e.g., program listings of an interactive guide) that would normally appear in the area associated with the blind spot on a display screen to an area that is not associated with a blind spot.

In some embodiments, the media guidance application determines a first set of coordinates on the display screen, in which the first set of coordinates defines an area of the display screen that is perceived as being distorted by a user with a disability. After receiving a media asset that includes a media object at a first position on the display screen, the media guidance application determines whether or not the first set of coordinates corresponds to the first position. In response to determining that the first set of coordinates corresponds to the first position, the media guidance application determines a second position on the display screen that is not perceived as being distorted by the user with the disability and generates the media object at the second position.

In some embodiments, the media guidance application may determine the first set of coordinates on the display screen by determining a viewing location of the user relative to the display screen and determine a focus area of that user based on the viewing location. The media guidance application may also determine a measure of a disability of a user, and based on that measure, determine a perceived distortion of the focus area. The media guidance application may also determine a distance of the user from the focus area, determine a viewing trajectory associated with the user, and calculate a geometrical area of the focus area based the distance of the user from the focus area and the viewing trajectory associated with the user. The media guidance application may also determine an overlap of the perceived distortion and the display screen and determine the coordinates associated with the overlap. Additionally, the media guidance application may determine whether a position of a media object is included in the overlap.

In some embodiments, media guidance application may determine the measure of the disability of the user by monitoring user inputs of the user to generate a user profile, and cross-referencing the user profile with a database associated with measures for disabilities to determine the measure of the disability of a user. For example, the media guidance application may "actively" determine the disability of a user (e.g., receive user inputs associated with a disability setting), or the media guidance application may "passively" determine the disability of a user (e.g., searching prescription and/or medical information database for information associated with the user, monitoring interactions of the user with the media guidance application that are indicative of a disability such as a user repeatedly performing erroneous inputs, etc.).

In some embodiments, the media guidance application may compensate for the disabilities in numerous ways. For example, the media guidance application may arrange media objects into locations on a display screen that the disability of the user does not affect. In another example, if a media object (s) cannot be generated at a second position on the display screen, the media guidance application may present an alternative media asset. Additionally or alternatively, the media guidance application may graphically accentuate a media object (e.g., adjust the size, shape, brightness, etc.) in order to compensate for the disability of a user. For example, the media guidance application may determine a size associated with a media object relative to the display screen and increase or decrease the size associated with the media object at the second position on the display screen.

It should be noted, the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF DRAWINGS

Figure 1:
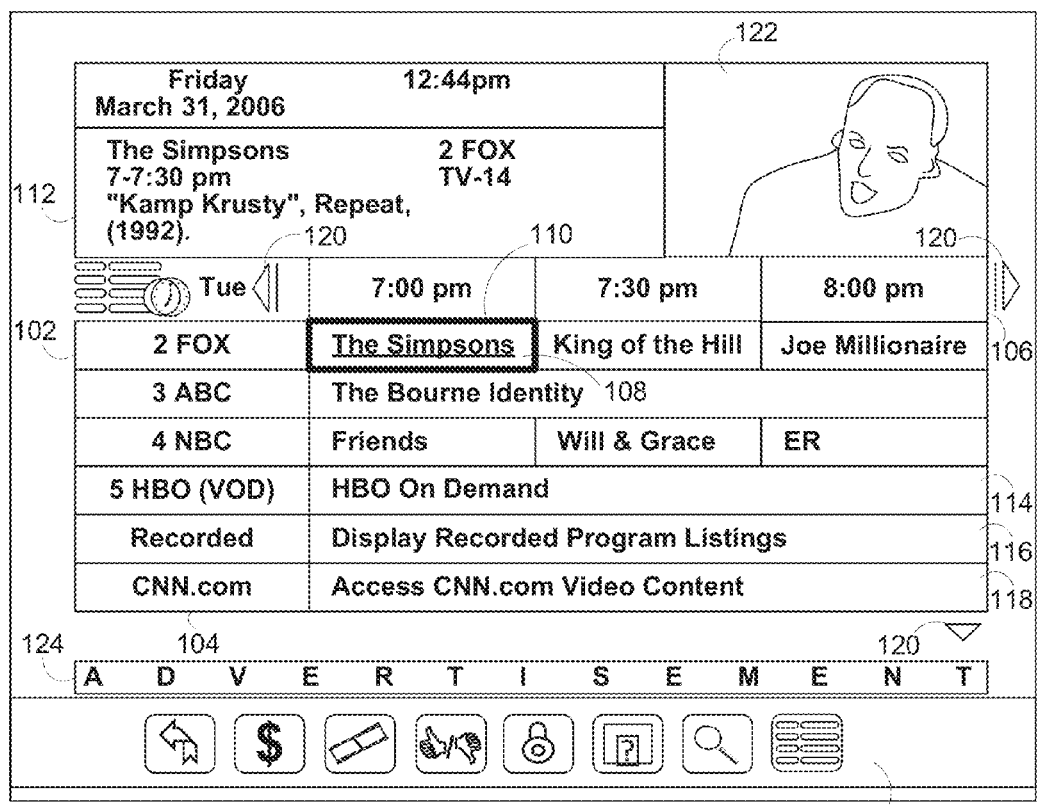
FIG. 1 shows an illustrative example of a media guidance application in accordance with some embodiments of the disclosure.

Methods and systems are disclosed herein for arranging media objects on a display screen to compensate for disabilities of a user. For example, if a media guidance application determines that, based on a particular disability, a user cannot see (or has limited vision with respect to) a portion of a screen displaying a media asset, the media guidance application alters the arrangement of media objects in the media asset to compensate for disabilities of a user.

For example, the media guidance application may determine that a user has a limited visual focus area, which occupies only a portion of a display screen, and poor peripheral vision about the focus area. In order to compensate for the limited visual focus area, the media guidance application may adjust media objects (e.g., menu icons in an interactive guide) that would normally appear outside the limited visual focus area of the user such that the media objects appear within the visual focus area of the user on the display screen.

An application that provides guidance through an interface that allows users to efficiently navigate content selections, easily identify content that they may desire, and present the content is referred to herein as a media guidance application or, sometimes, an interactive media guidance application or a guidance application. Media guidance applications may take various forms depending on the content for which they provide guidance. One typical type of media guidance application is an interactive program guide. Interactive program guides (sometimes referred to as electronic program guides) are well-known guidance applications that, among other things, allow users to navigate among and locate many types of content or media assets.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, games, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

As used herein, a "disability" is an impairment that may be sensory, cognitive, mental, emotional, developmental, or some combination of these. A sensory disability is an impairment of one of the senses. Sensory disabilities may include, but are not limited to, vision impairment (e.g., partial or complete vision loss, color blindness, sensitivity to bright lights, astigmatisms, etc.). In addition, as used herein, a "measure of a disability" is a qualitative or quantitative description of the impairment or the extent of the impairment of the user.

In some embodiments, the media guidance application may compensate for a disability by adjusting the position of a media object on a display screen. For example, a media asset transmitted for display on a display screen may include multiple objects. As used herein, a "media object" refers to human-readable and/or human-recognizable data appearing on the display screen associated with a user device. A media object may be a variable, function, or file. In some embodiments, the media object may appear as a character or object within a media asset, an icon, program listing, or program cell within a program guide, and/or an advertisement or media asset itself.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Media guidance data may also include data associated with the position of media objects on the display screen. As used herein, an "initial position" refers to the position on a display screen of a media object before the position of the media object is adjusted by a media guidance application in order to compensate for a disability of a user. The initial position of the media object may be described according to a set of coordinates on the display screen. In some embodiments, the set of coordinates may include a mapping of the location of the media asset on the display screen as well as the time (e.g., start time, end time, duration, etc.) that the media object appears (whether continuously or not) on the display screen.

For example, the media guidance application may receive media guidance data for subtitles and other media objects associated with a media asset. The media guidance application may also receive media guidance data defining an initial position of the subtitles and other media objects. The media guidance application may determine (e.g., as described below) that due to the initial position of the subtitles, the subtitles will appear in an area of the display screen that will be perceived by a user as distorted. Consequently, the media guidance application may move the display of the subtitles to an area of the display screen that is not perceived to be distorted.

The media guidance application may also move one or more of the other media objects as well, or the media guidance application may leave one or more of the other media objects in its initial position. For example, the media guidance data may indicate that one or more of the other media objects has an initial position that will not appear in an area perceived to be distorted by a user, consequently, the media guidance application will not re-position the one or more media objects. Additionally or alternatively, the media guidance data may indicate that one or more of the other media objects has an initial position that will appear in an area perceived to be distorted by a user; however, the media guidance application may determine not to re-position the one or more other media objects due to the relevance of the one or more media objects (e.g., as discussed below in relation to step 918 (FIG. 9)), due to limited availability of other positions that are not perceived by the user to be distorted (e.g., as discussed in relation to step 922 (FIG. 9)), or for any other reason discussed herein.

Figure 2:
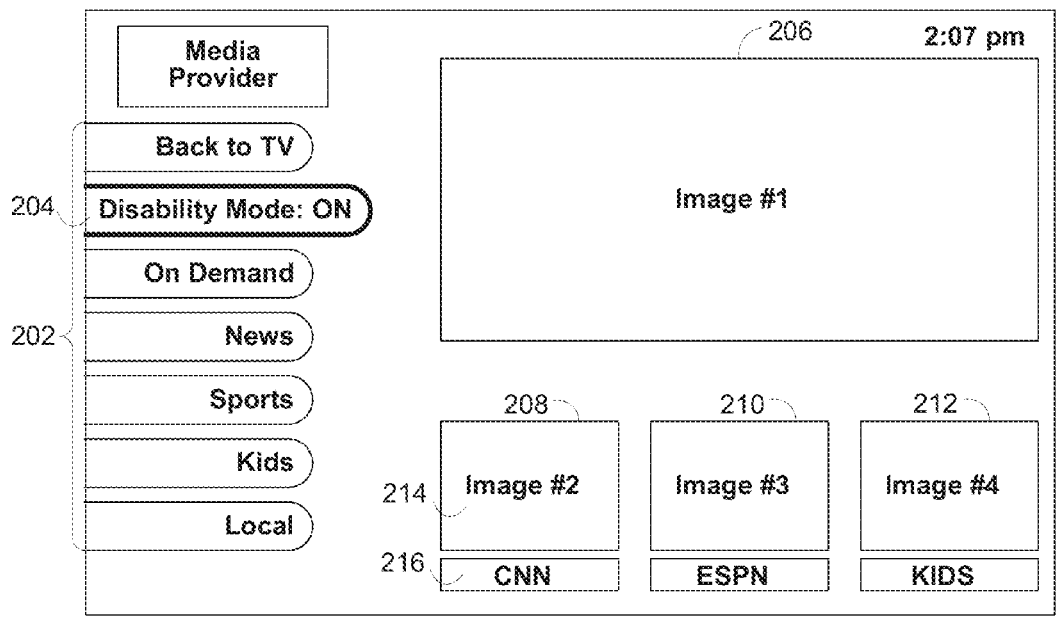
FIG. 2 shows another illustrative example of a media guidance application in accordance with some embodiments of the disclosure.

FIGS. 1-2 show illustrative display screens that may be used to provide media guidance data. The display screens shown in FIGS. 1-2, 6A-C, and 7A-C may be implemented on any suitable user equipment device or platform. While the displays of FIGS. 1-2, 6A-C, and 7A-C are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100, which includes various media objects, arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, selectable option 204 is selected, initiating a disability mode, which causes a media guidance application to compensate for disabilities of the user (e.g., as discussed below in relation to FIG. 8). In display 200 the listings may provide graphical images including cover art, still images from the content, video clip previews, live video from the content, or other types of content that indicate to a user the content being described by the media guidance data in the listing or to compensate for a disability of a user. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size or otherwise adjusted in order to compensate for a disability of a user. Listings may be graphically accentuated (e.g., modifying the size, shape, color, brightness, contrast, or any other visual characteristic of the media object) to indicate degrees of interest to the user or to emphasize certain content, as desired by the content provider or based on user preferences, or to compensate for a disability of a user. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
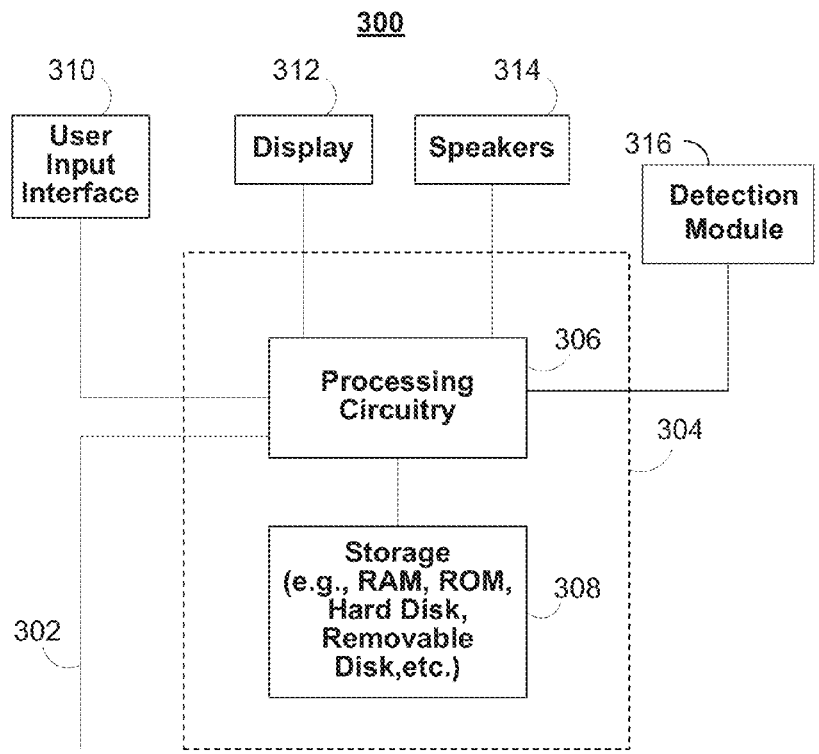
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

User equipment device 300 may also incorporate or be accessible to detection module 316. Detection module 316 may further include various components (e.g., a video detection component, an audio detection component, etc.). In some embodiments, detection module 316 may include components that are specialized to generate particular information. For example, as discussed below in relation to FIG. 5, detection module 316 may include a focus area detection component, which determines or receives a location upon which one or both of a user's eyes are focused, a location of the user in a viewing area of the user device, and/or any other information needed for the functioning for the media guidance application. The location upon which a user's eyes are focused is referred to herein as the user's "focus area." In some embodiments, the focus area detection component may monitor one of both eyes of a user of user equipment 300 to identify a focus area on display 312 for the user. The focus area detection component may additionally or alternatively determine whether one or both eyes of the user are focused on display 312 (e.g., indicating that a user is viewing display 312) or focused on a location that is not on display 312 (e.g., indicating that a user is not viewing display 312). In some embodiments, the focus area detection component includes one or more sensors that transmit data to processing circuitry 306, which determines a user's focus area. The focus area detection component may be integrated with other elements of user equipment device 300, or the focus area detection component, or any other component of detection module 316 and may be a separate device or system in communication with user equipment device 300.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
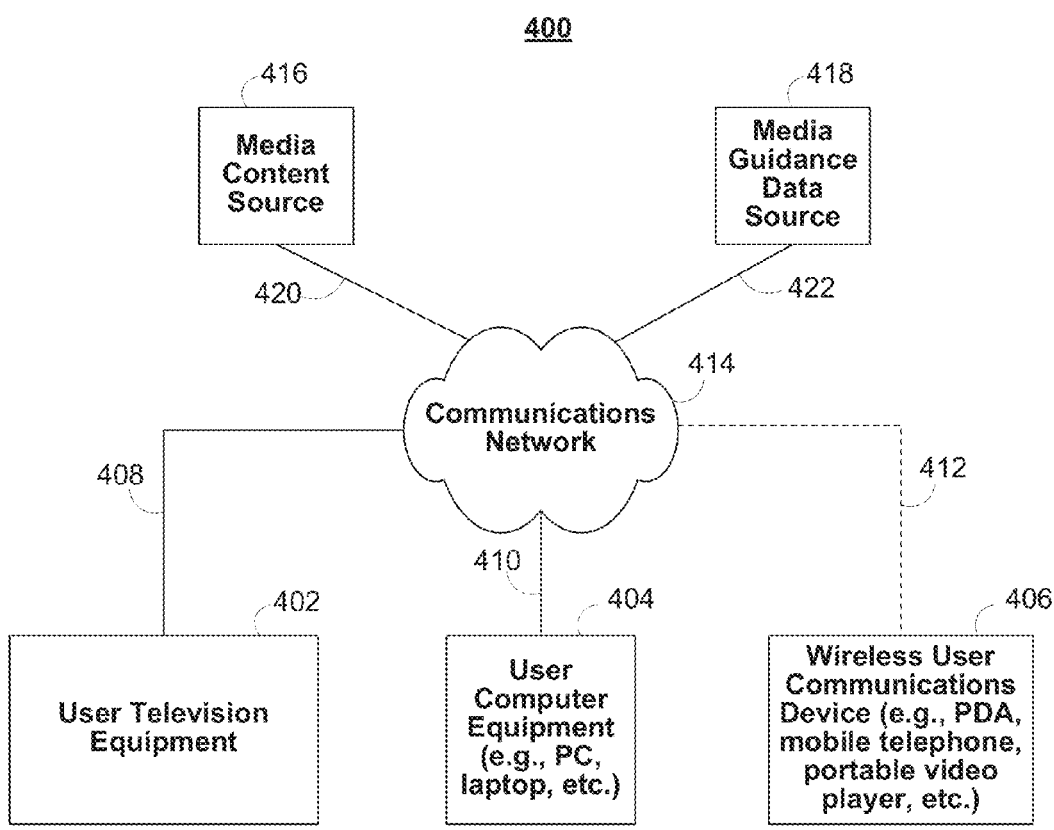
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution equipment, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, standalone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
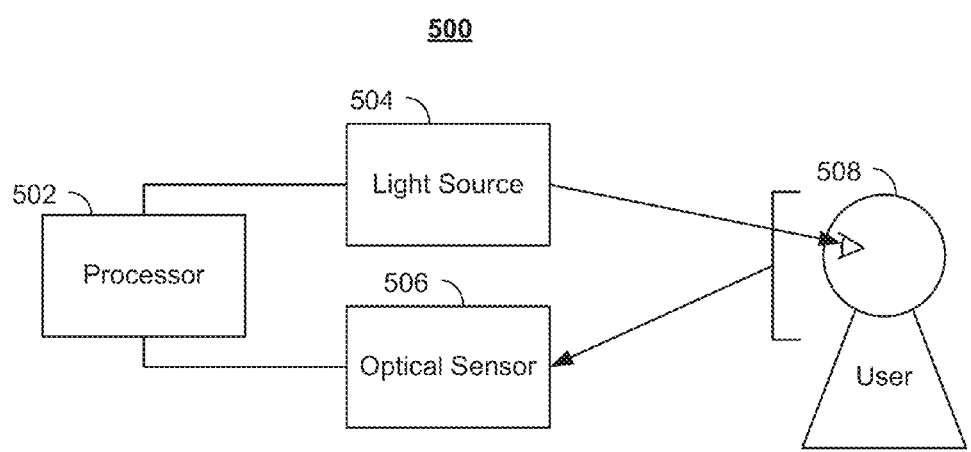
FIG. 5 is an illustrative example of one component of a detection module, which may be accessed by a media guidance application in accordance with some embodiments of the disclosure.

FIG. 5 is an illustrative example of one component of a detection module, which may be accessed by a media guidance application in accordance with some embodiments of the disclosure. FIG. 5 shows focus area detection component 500, which may be used to identify the focus area of a user of user equipment 300 (FIG. 3), in order to compensate for a disability of the user. Focus area detection component 500 includes processor 502, light source 504, and optical sensor 506. Light source 504 transmits light that reaches at least one eye of a user, and optical sensor 506 is directed at the user to sense reflected light. Optical sensor 506 transmits collected data to processor 502, and based on the data received from optical sensor 506, processor 502 determines a user's focus area.

Additionally or alternatively, the media guidance application may use the data collected by optical sensor 506 to determine a distance of the user from the focus area, determine a viewing trajectory associated with the user, and calculate a geometrical area of the focus area based the distance of the user from the focus area and the viewing trajectory associated with the user (e.g., while employing standard trigonometric functions).

In some embodiments, focus area detection component 500 is configured for determining a focus area of a single user. In other embodiments, focus area detection component 500 may determine focus areas for a plurality of users. Focus area detection component 500 may identify multiple users of user equipment device 300.

Processor 502 may be integrated with one or more light sources 504 and one or more optical sensors 506 in a single device. Additionally or alternatively, one or more light sources 504 and one or more optical sensors 506 may be housed separately from processor 502 and in wireless or wired communication with processor 502. One or more of processors 502, light sources 504, and optical sensors 506 may be integrated into user equipment device 300.

Processor 502 may be similar to processing circuitry 306 described above. In some embodiments, processor 502 may be processing circuitry 306, with processing circuitry 306 in communication with light source 504 and optical sensor 506. In other embodiments, processor 502 may be separate from but optionally in communication with processing circuitry 306.

Light source 504 transmits light to one or both eyes of one or more users. Light source 504 may emit, for example, infrared (IR) light, near infrared light, or visible light. The light emitted by light source 504 may be collimated or non-collimated. The light is reflected in a user's eye, forming, for example, the reflection from the outer surface of the cornea (i.e. a first Purkinje image), the reflection from the inner surface of the cornea (i.e. a second Purkinje image), the reflection from the outer (anterior) surface of the lens (i.e. a third Purkinje image), and/or the reflection from the inner (posterior) surface of the lens (i.e. a fourth Purkinje image).

Optical sensor 506 collects visual information, such as an image or series of images, of one or both of one or more users' eyes. Optical sensor 506 transmits the collected image(s) to processor 502, which processes the received image(s) to identify a glint (i.e. corneal reflection) and/or other reflection in one or both eyes of one or more users. Processor 502 may also determine the location of the center of the pupil of one or both eyes of one or more users. For each eye, processor 502 may compare the location of the pupil to the location of the glint and/or other reflection to estimate the focus area. Processor 502 may also store or obtain information describing the location of one or more light sources 504 and/or the location of one or more optical sensors 506 relative to display 312. Using this information, processor 502 may determine a user's focus area on display 312, or processor 502 may determine whether or not a user's focus area is on display 312. In addition, processor 502 may plot the coordinates of a user's focus area relative to display 312 (e.g., for use in determining a perceived distortion area caused by a disability of a user as discussed in relation to FIG. 8 below).

In some embodiments, focus area detection component 500 performs best if the position of a user's head is fixed or relatively stable. In other embodiments, focus area detection component 500 is configured to account for a user's head movement, which allows the user a more natural viewing experience than if the user's head were fixed in a particular position.

In some embodiments accounting for a user's head movement, focus area detection component 500 includes two or more optical sensors 506. For example, two cameras may be arranged to form a stereo vision system for obtaining a 3D position of the user's eye or eyes; this allows processor 502 to compensate for head movement when determining the user's focus area. The two or more optical sensors 506 may be part of a single unit or may be separate units. For example, user equipment device 300 may include two cameras used as optical sensors 506, or focus area detection component 500 in communication with user equipment device 300 may include two optical sensors 506. In other embodiments, each of user equipment device 300 and focus area detection component 500 may include an optical sensor, and processor 502 receives image data from the optical sensor of user equipment device 300 and the optical sensor of focus area detection component 500. Processor 502 may receive data identifying the location of optical sensor 506 relative to display 312 and/or relative to each other and use this information when determining the focus area.

In other embodiments accounting for a user's head movement, focus area detection component 500 includes two or more light sources for generating multiple glints. For example, two light sources 504 may create glints at different locations of an eye; having information on the two glints allows the processor to determine a 3D position of the user's eye or eyes, allowing processor 502 to compensate for head movement. Processor 502 may also receive data identifying the location of light sources 504 relative to display 312 and/or relative to each other and use this information when determining the focus area.

In some embodiments, other types of focus area detection components that do not utilize a light source may be used. For example, optical sensor 506 and processor 502 may track other features of a user's eye, such as the retinal blood vessels or other features inside or on the surface of the user's eye, and follow these features as the eye rotates. Any other equipment or method for determining one or more users' focus area(s) not discussed above may be used in addition to or instead of the above-described embodiments of focus area detection component 500.

It should be noted that focus area detection component 500 is but one type of component that may be incorporated into or accessible by detection module 316 (FIG. 3) or the media guidance application. Other types of components, which may generate other types of data (e.g., video, audio, textual, etc.) are fully within the bounds of this disclosure.

Figure 6A:
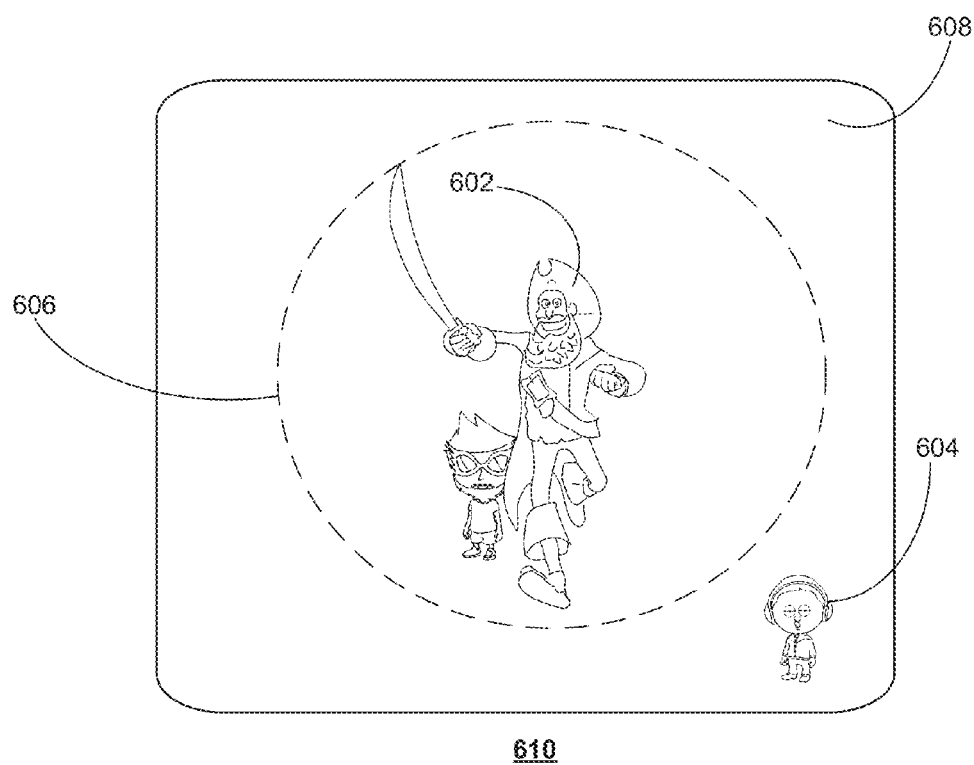
FIG. 6A shows an illustrative example of a display featuring a media asset prior to a media guidance application arranging media objects on the display to compensate for disabilities of a user in accordance with some embodiments of the disclosure.
Figure 6B:
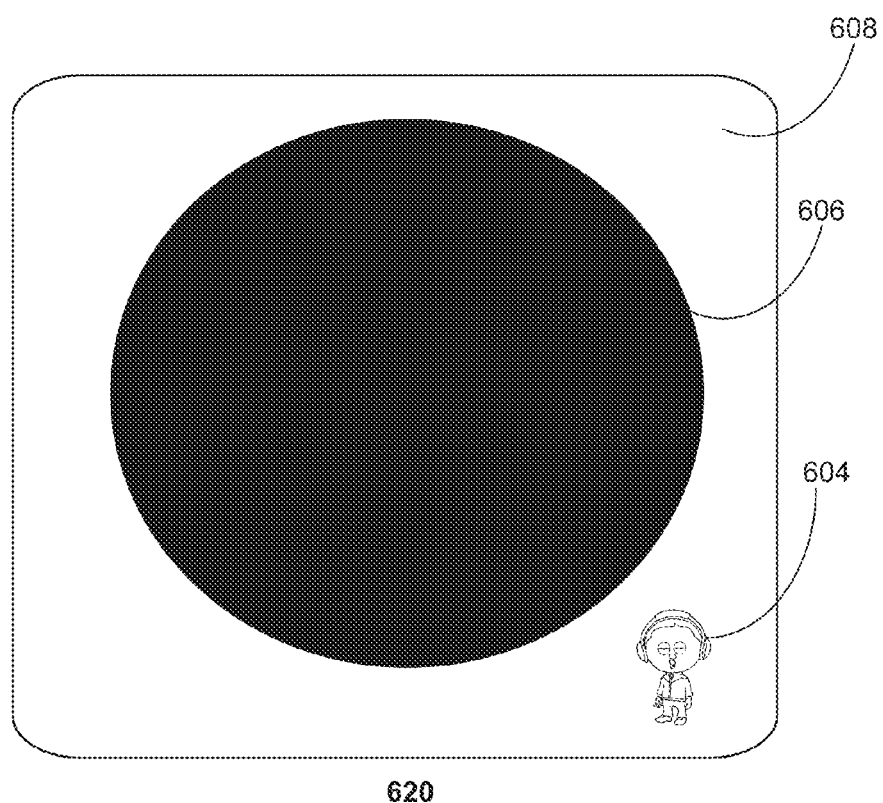
FIG. 6B shows an illustrative example of a display corresponding to the display of FIG. 6A prior to a media guidance application arranging media objects on the display to compensate for disabilities of a user, as viewed by a user, in accordance with some embodiments of the disclosure.
Figure 6C:
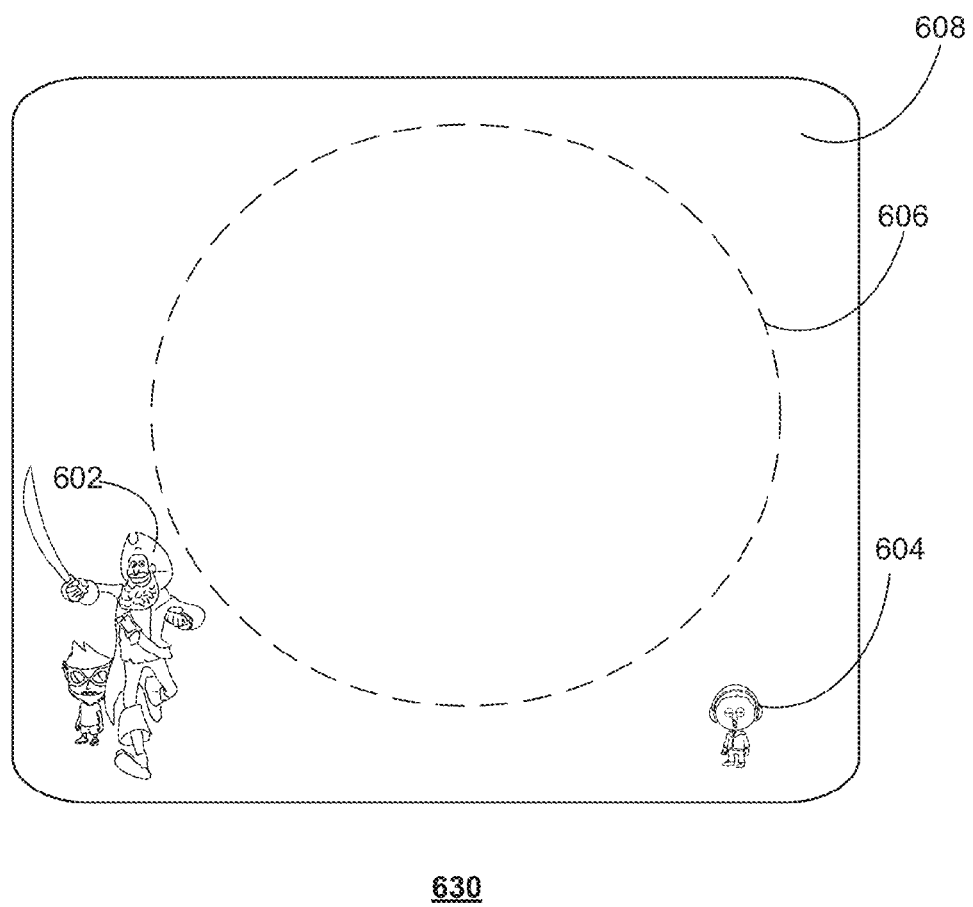
FIG. 6C shows an illustrative example of a display corresponding to the display of FIG. 6A subsequent to a media guidance application arranging media objects on the display to compensate for disabilities of a user in accordance with some embodiments of the disclosure.

FIGS. 6A-C provides illustrative examples of the media guidance application arranging media objects on the display to compensate for disabilities of a user. It should be noted that display 610, 620, and 630 are illustrative only and should not be taken to be limiting in any manner. For example, in some embodiments, one or more of the features of display 100 and/or display 200 may be incorporated into displays 610, 620, and/or 630. In some embodiments, displays 610, 620, and/or 630 may appear on the display (e.g., display 312 (FIG. 3)) of a user equipment device (e.g., user equipment device 402, 404, and/or 406 (FIG. 4)). Moreover, the media guidance application may use one or more steps from one or more of the processes described in FIGS. 8-9 below to generate displays 610, 620, and/or 630 or any of the features described therein.

FIG. 6A shows an illustrative example of a display featuring a media asset prior to a media guidance application arranging media objects on the display to compensate for disabilities of a user. Display 610 currently displays a media asset with media object 602 and media object 604 within focus area 608 (e.g., as determined as described in relation to FIG. 5). Display 610 also includes perceived distortion area 606. Perceived distortion area 606 represents the bounds of an area of display 610 that is not perceived to be distorted based on a disability of a user. For example, a user may suffer from macular degeneration, which reduces the central vision of a user. In this example, the vision loss of the user may be represented by the area within perceived distortion area 606.

FIG. 6B shows an illustrative example of a display corresponding to the display of FIG. 6A prior to a media guidance application arranging media objects on the display to compensate for disabilities of a user, as viewed by a user. For example, if a user has macular degeneration, display 610 (FIG. 6A) may appear as display 620. In display 620, the display of an area within perceived distortion area 606 is obstructed. Accordingly, media object 602 cannot be seen by a user viewing display 620. Moreover, a user may not comprehend the context of the media asset featuring media object 602 and 604 because not all media objects are seen by the user.

In response to the determining that a user has a disability (e.g., as described in FIG. 9 below), the media guidance application may determine which media objects of the media asset a user cannot satisfactorily identify by comparing focus area 608 (e.g., as determined based on detection module 316 (FIG. 3) and/or focus area detection component 500 (FIG. 5)) of the user to perceived distortion area 606. In response to determining (e.g., as described in relation to FIG. 8) that media object 602 is within the perceived distortion area, and thus affected by the disability of the user, the media guidance application may re-arrange media object 602 and/or any media objects within the media asset on display 610 to compensate for the effects of macular degeneration on the user.

FIG. 6C shows an illustrative example of a display corresponding to the display of FIG. 6A subsequent to a media guidance application arranging media objects on the display to compensate for disabilities of a user. In display 630, media object 602 has been re-positioned such that it is now outside perceived distortion area 606. In addition, media object 602 has also had its size (e.g., relative to display 610) modified. For example, in order to re-position media object 602 outside of perceived distortion area 606, the media guidance application may adjust the size, shape, or any other visual characteristic of media object 602.

Figure 7A:
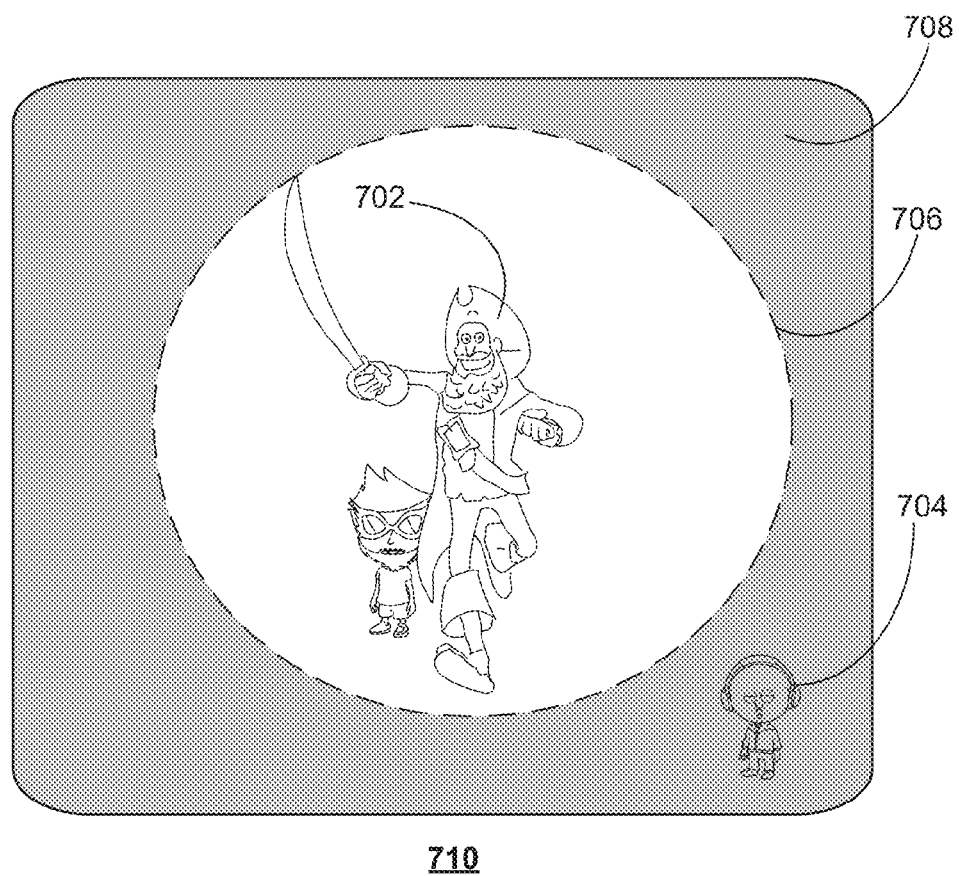
FIG. 7A shows an illustrative example of a display featuring a media asset prior to a media guidance application arranging media objects on the display to compensate for disabilities of a user in accordance with some embodiments of the disclosure.
Figure 7B:
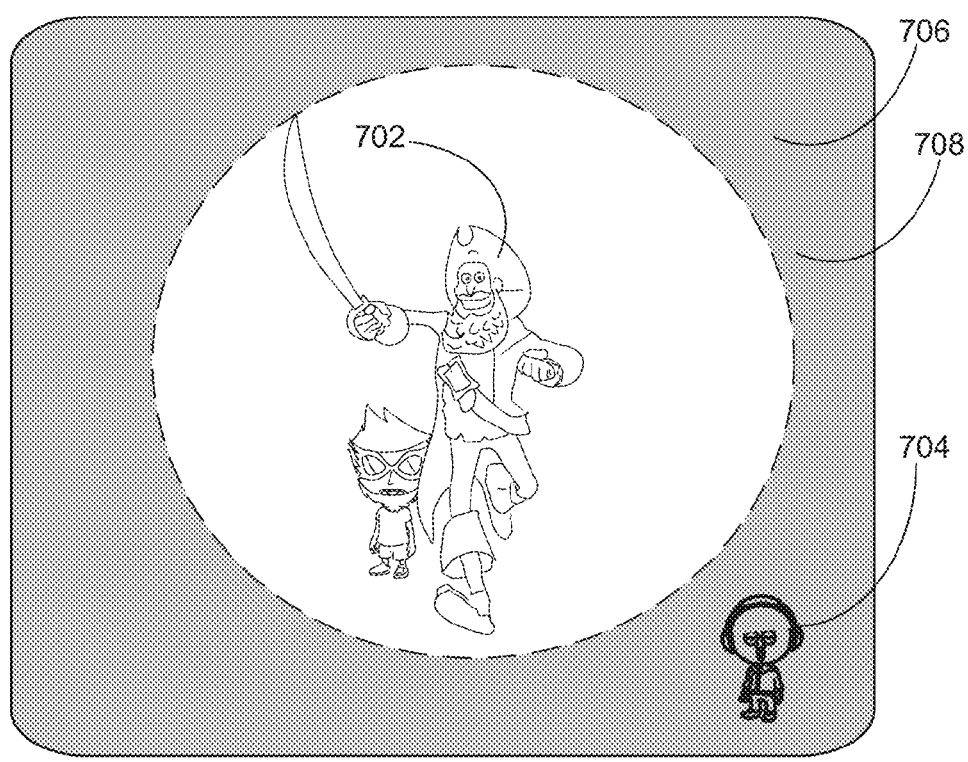
FIG. 7B shows an illustrative example of a display corresponding to the display of FIG. 7A subsequent to a media guidance application arranging media objects on the display to compensate for disabilities of a user in accordance with some embodiments of the disclosure.
Figure 7C:
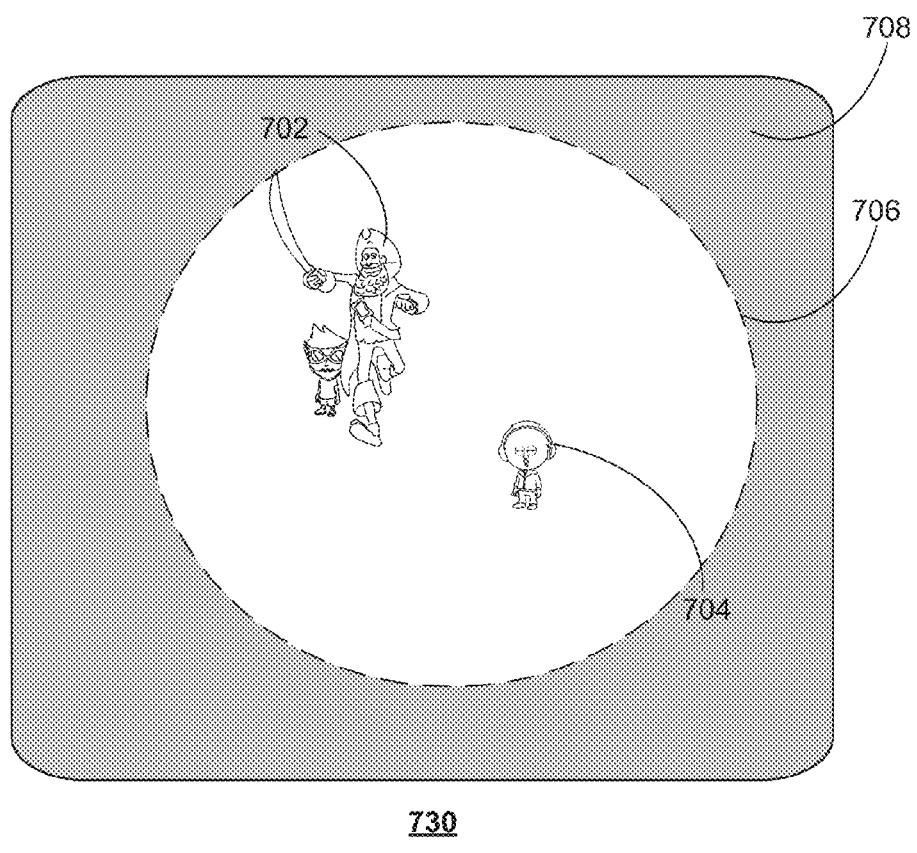
FIG. 7C shows an illustrative example of a display corresponding to the display of FIG. 7A subsequent to a media guidance application graphically accentuating media objects on the display to compensate for disabilities of a user in accordance with some embodiments of the disclosure.

FIGS. 7A-C provides illustrative examples of the media guidance application arranging media objects on the display to compensate for disabilities of a user. It should be noted that display 710, 720, and 730 are illustrative only and should not be taken to be limiting in any manner. For example, in some embodiments, one or more of the features of display 100 and/or display 200 may be incorporated into displays 710, 720, and/or 730. In some embodiments, displays 710, 720, and/or 730 may appear on the display (e.g., display 312 (FIG. 3)) of a user equipment device (e.g., user equipment device 402, 404, and/or 406 (FIG. 4)). Moreover, the media guidance application may use one or more steps from one or more of the processes described in FIGS. 8-9 below to generate displays 710, 720, and/or 730 or any of the features described therein.

FIG. 7A shows an illustrative example of a display featuring a media asset prior to a media guidance application arranging media objects on the display to compensate for disabilities of a user, as viewed by a user. Display 710 currently displays a media asset with media object 702 and media object 704 within focus area 708 (e.g., as determined as described in relation to FIG. 5). Display 710 also includes perceived distortion area 706. Perceived distortion area 706 represents the bounds of an area of display 710 that is not perceived to be distorted based on a disability of a user. For example, a user may suffer from glaucoma, which reduces the peripheral vision of a user. In this example, the vision loss of the user may be represented by the area outside perceived distortion area 706.

FIG. 7B shows an illustrative example of a display corresponding to the display of FIG. 7A subsequent to a media guidance application compensating for disabilities of a user. In display 720, the display of the area outside perceived distortion area 706 is distorted (e.g., appears to a user with a visual acuity below that of the area within perceived distortion area 706). Accordingly, media object 704 may not be seen clearly (e.g., appear to a user with a visual acuity below that of the area within perceived distortion area 706). Moreover, a user may not comprehend the context of the media asset featuring media object 702 and 704 because not all media objects are seen clearly by the user.

In response to the determining that a user has a disability (e.g., as described in FIG. 9 below), the media guidance application may determine (e.g., via control circuitry 304) which media objects of the media asset a user cannot clearly identify by comparing focus area 708 (e.g., as determined based on detection module 316 (FIG. 3) and/or focus area detection component 500 (FIG. 5)) of the user to perceived distortion area 706. In response to determining (e.g., as described in relation to FIG. 8) that media object 704 is outside perceived distortion area 706, and thus affected by the disability of the user, the media guidance application has graphically accentuated media object 704 (e.g., displayed media object 704 with an increased brightness, contrast, saturation and/or sharpness) to compensate for the effects of glaucoma on the user.

FIG. 7C shows another illustrative example of a display corresponding to the display of FIG. 7A subsequent to a media guidance application re-positioning media object to compensate for disabilities of a user. In display 730, media object 704 has been re-positioned such that it is now within perceived distortion area 706, and thus not affected by a disability (e.g., as determined according to process 900 (FIG. 9)). In addition, media objects 702 and 704 have also had their respective sizes (e.g., relative to display 730) modified. For example, in order to re-position media objects 702 and 704 both within perceived distortion area 706, and maintain their relative locations to each other on the display screen, the media guidance application (e.g., via control circuitry 304) adjusted the size, shape, or other visual characteristics of media objects 702 and 704.

Figure 8:
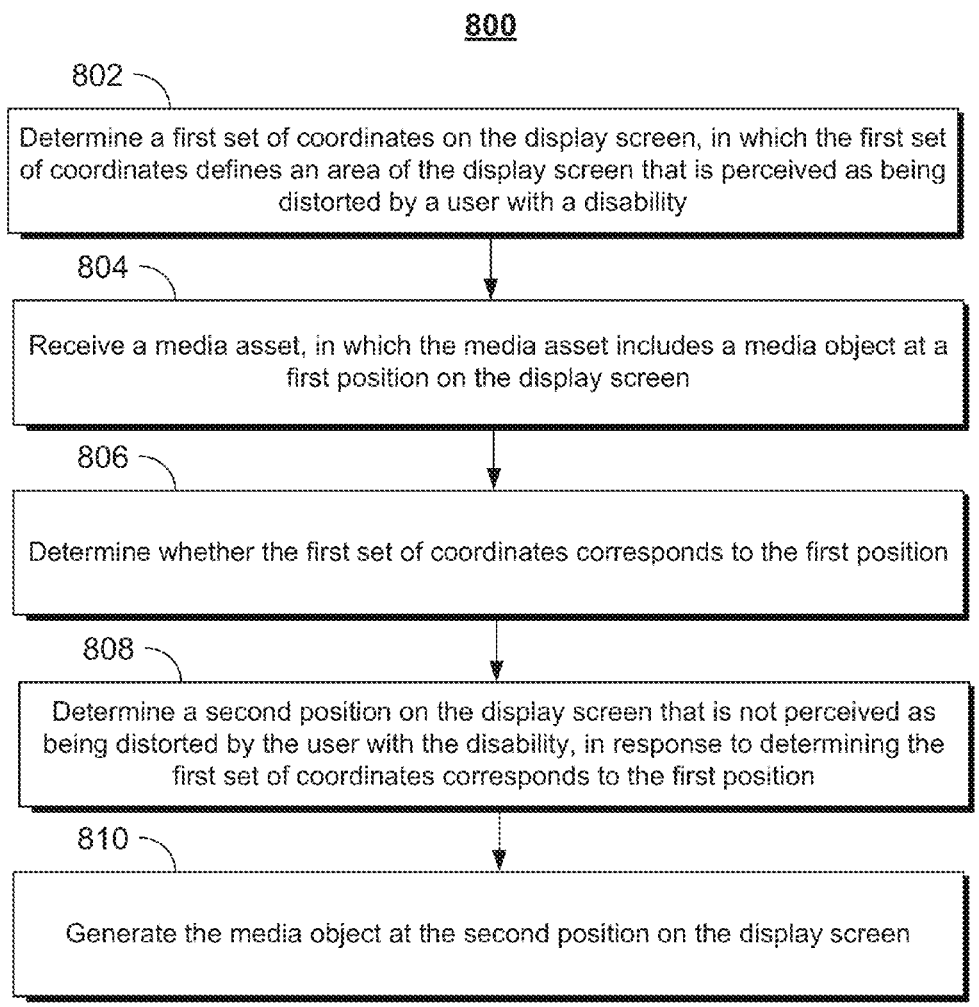
FIG. 8 is a flowchart of illustrative steps for re-positioning a media object based on the disabilities of a user in accordance with some embodiments of the disclosure.

FIG. 8 is a flowchart of illustrative steps for re-positioning a media object based on the disabilities of a user. It should be noted that process 800, or any step thereof, could occur on, or be provided by, any of the devices shown in FIGS. 3-4. For example, process 800 may be executed by control circuitry 304 (FIG. 3) as instructed by the media guidance application (e.g., implemented on any of the devices shown and described in FIG. 4) to produce any of the displays shown in FIGS. 1-2, 6A-C, and 7A-C.

At step 802, the media guidance application determines a first set of coordinates on a display screen, in which the first set of coordinates defines an area of the display screen that is perceived as being distorted by the user with the disability. In some embodiments, the media guidance application may determine a focus area (e.g., as described in relation to FIG. 5) based on identifying a location of a user relative to a display screen (e.g., display 100 (FIG. 1), 200 (FIG. 2), 610 (FIG. 6), 710 (FIG. 7), etc.). The media guidance application (e.g., via control circuitry 304 (FIG. 3)) may also plot coordinates defining the focus area of the user. For example, after determining that the user is viewing a display screen (e.g., display 610 (FIG. 6)), the media guidance application may determine (e.g., via focus area detection component 500 (FIG. 5)) a focus area of a user (e.g., focus area 608 (FIG. 6)).

In some embodiments, the media guidance application may also determine a disability of a user (e.g., as discussed in step 906 (FIG. 9) below). For example, the media guidance application may determine a particular visual impairment associated with a user and the effect that the visual impairment has on the user's vision (e.g., as discussed below in relation to step 910 (FIG. 9)). The media guidance application (e.g., via control circuitry 304 (FIG. 3)) may then plot an area of perceived distortion (e.g., perceived distortion area 606 (FIG. 6A) associated with the disability of the user.

For example, the media guidance application may determine a measure of a disability of a user. In some embodiments, the media guidance application may cross-reference the disability of a user with a local (e.g., on storage 308 (FIG. 3)) or remote (e.g., at content source 416, media guidance data source 418, and/or any location accessible via communications network 414 (FIG. 4)) database to determine the effect the disability may have on the focus area of the user.

For example, in some embodiments, the media guidance application may input the disability into a database to determine the amount a focus area is reduced due to a particular disability (e.g., both in geometric terms and visual acuity) and/or where the disability (e.g., center of vision, peripheral area of vision, a particular location in the focus area of a user, etc.) occurs. In some embodiments, the database may be associated with medical information for the user or a specific demographic category of users. For example, in some embodiments, the database may store prescription information about a user that the media guidance application interprets.

At step 804, the media guidance application receives a media asset in which the media asset includes a media object at a first position on the display screen. For example, the media guidance application may receive a program guide (e.g., as shown in display 100 (FIG. 1)), which includes numerous media objects (e.g., program information region 112 (FIG. 1)). Each media object has an initial position. In some embodiments, the initial position of each media object, as well as the media object itself, may be described by data transmitted (e.g., from content source 416, media guidance data source 418, and/or any location accessible via communications network 414 (FIG. 4)) to a user device (e.g., user equipment device 402, 404, and/or 406 (FIG. 4)) with the media asset (e.g., metadata). In some embodiments, the initial position of each media object may be transmitted before a corresponding media asset and stored (e.g., on storage 308 (FIG. 3)).

Additionally or alternatively, detection module 316 (FIG. 3)) may incorporate or have access to one or more content-recognition modules, which may be used by the media guidance application to analyze information received from a content capture device (e.g., video and/or audio recorder). For example, the media guidance application may include an object recognition module. The object recognition module may use edge detection, pattern recognition, including, but not limited to, self-learning systems (e.g., neural networks), optical character recognition, on-line character recognition (including, but not limited to, dynamic character recognition, real-time character recognition, intelligent character recognition), and/or any other suitable technique or method to determine the positions of objects and/or characteristics of video and audio content. For example, the media guidance application may receive a media asset in the form of a video (e.g., an audio/video recording of a user). The video may include a series of frames. For each frame of the video, the media guidance application may use an object recognition module to determine the position of each media object. In addition, the object recognition module may assist the media guidance application in determining whether or not a particular media object is relevant (e.g., as discussed below in relation to step 924 (FIG. 9)).

In some embodiments, the content-recognition module or algorithm may also include audio analysis and speech recognition techniques, including, but not limited to, Hidden Markov Models, dynamic time warping, and/or neural networks (as described above) to process audio data and/or translate spoken words into text. The content-recognition module may also use any other suitable techniques for processing audio and/or visual data.

In addition, the media guidance application may use multiple types of optical character recognition and/or fuzzy logic, for example, when analyzing subtitles (e.g., in order to determine the relevance of a media object) or comparing multiple data fields (e.g., as contained in databases described below). For example, the media guidance application may arrange the text into data fields and cross-reference the data fields with other data fields (e.g., in a look-up table database). Using fuzzy logic, the system may determine two fields and/or values to be identical even though the substance of the data field or value (e.g., two different spellings) is not identical. In some embodiments, the system may analyze particular data fields of a database for particular values or text. Furthermore, the data fields could contain values (e.g., the data fields could be expressed in binary or any other suitable code or programming language) other than human-readable text.

At step 806, the media guidance application determines whether or not the first set of coordinates corresponds to the first position. For example, after mapping the coordinates of the area of the display screen that is perceived to be distorted based on a disability of a user, the media guidance application (e.g., via control circuitry 304 (FIG. 4)), determines location of the first position relative to the coordinates. In addition, the media guidance application may determine (e.g., via control circuitry 304 (FIG. 3)) rules associated with particular disabilities. For example, in some embodiments, the media guidance application may determine that the media object may be affected when its position is within (e.g., as described in FIGS. 6A-C) the bounds of the area of perceived distortion, and in some embodiments, the media guidance application may determine that the media object may be affected when its position is outside (e.g., as described in FIGS. 7A-C) the bounds of the area of perceived distortion.

In some embodiments, the rules (e.g., based on the disability of a user) applied to the position may be stored locally (e.g., on storage 308 (FIG. 3)) or remotely (e.g., at content source 416, media guidance data source 418, and/or any location accessible via communications network 414 (FIG. 4)).

At step 808, the media guidance application, in response to determining the first set of coordinates corresponds to the first position, determines a second position on the display screen that is not perceived as being distorted by the user with the disability. For example, if the media guidance application determines that a media object (e.g., media object 602 (FIG. 6)) is within the bounds of the area of perceived distortion (e.g., perceived distortion area 606 (FIG. 6)) and that a user is likely not to comprehend media objects within the area of perceived distortion, the media guidance application may determine (e.g., via control circuitry 304 (FIG. 3)) a new position for the media object (e.g., as shown by the reposition of media object 602 in FIG. 6C described above).

In some embodiments, the media guidance application may cross-reference the initial position of the media object, characteristics of the media object, and positions and characteristics of other media objects with a locally (e.g., on storage 308 (FIG. 3)) or remotely (e.g., at content source 416, media guidance data source 418, and/or any location accessible via communications network 414 (FIG. 4)) database to determine a new position for the media object.

For example, in some embodiments, the media guidance application may input characteristics of the media object into a database to determine a new position for a media object that is logically related to the initial position (e.g., situated near media objects similar to those near the initial position). In some embodiments, the media guidance application may input characteristics of the media object into a database to determine a new position for a media object that is customized based on the user (e.g., based on the likelihood a user will need the media object based on previous interaction with media objects and/or media assets). In some embodiments, the media guidance application may input characteristics of the media object into a database to determine a new position for a media object that is determined based on the relevance of the media object (e.g., as described FIG. 9 below).

At step 810, the media guidance application generates the media object at the second position on the display screen. For example, the media guidance application may determine an overlap of the area of perceived distortion and the display screen and determine the coordinates associated with the overlap, and after determining that the new position of a media object is not included in the overlap, may generate the media object (e.g., media object 602 (FIG. 6C)) in a new position.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method.

Figure 9:
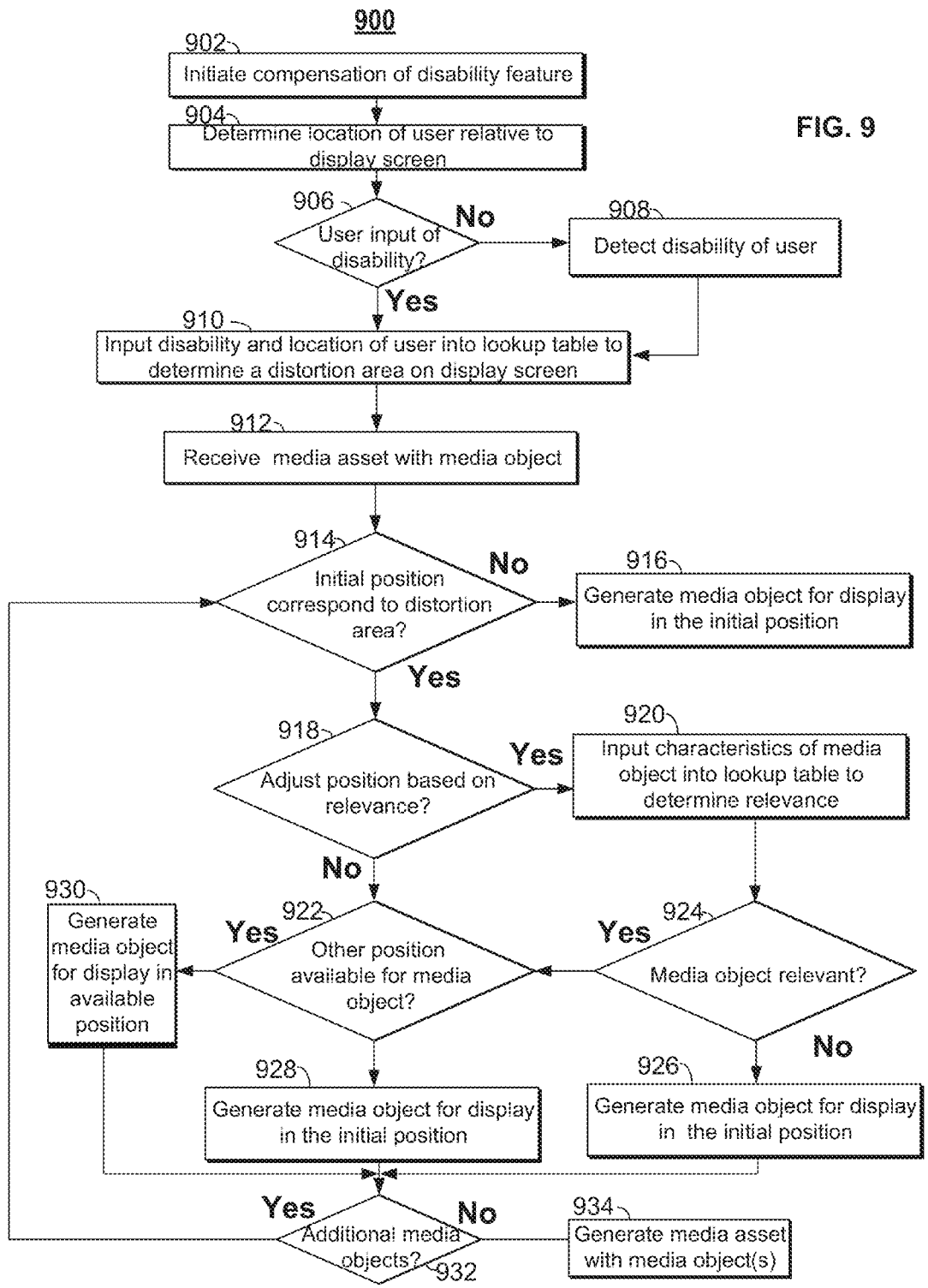
FIG. 9 is a flowchart of illustrative steps for arranging media objects on the display to compensate for disabilities of a user in accordance with some embodiments of the disclosure.

FIG. 9 is a flowchart of illustrative steps for arranging media objects on the display to compensate for disabilities of a user. It should be noted that process 900, or any step thereof, could occur on, or be provided by, any of the devices shown in FIGS. 3-4. For example, process 900 may be executed by control circuitry 304 (FIG. 3) as instructed by the media guidance application (e.g., implemented on any of the devices shown and described in FIG. 4) to produce any of the displays shown in FIGS. 1-2, 6A-C, and 7A-C.

At step 902, the media guidance application initiates a feature that compensates for a disability of a user. For example, the media guidance application may have received a user input selecting selectable option 204 (FIG. 2). In response, the media guidance application may activate one or more components (e.g., focus area detection component 500 (FIG. 5)).

At step 904, the media guidance application determines a location of the user relative to the display screen. For example, optical sensors (e.g., optical sensors 506 (FIG.)) may collect data related to the location of one or more users within the viewing area of the display (e.g., display 610 (FIG. 6A)). In some embodiments, the optical sensor may determine the distance of the user from the focus area and/or determine a viewing trajectory associated with the user. Based on the location of the user and the viewing trajectory, the media guidance application may determine a surface area (e.g., defined by a set of coordinates) of the display screen associated with the focus area. Additionally or alternatively, the media guidance application may collect (e.g., via detection module 316 (FIG. 3, which may incorporate or have access to one or more sensors and/or components)) x, y, z coordinates of the user relative to the sensor (or to the display screen). Based on the coordinates, the media guidance application may calculate (e.g., via processing circuitry 306 (FIG. 3)) the location of one or more users.

Additionally or alternatively, the media guidance application may receive one or more user inputs identifying the location of the user. For example, a user may enter (e.g., via display 200 (FIG. 2)) his/her location relative to the display screen. In some embodiments, the media guidance application may generate a profile with information about the user or viewing area associated with the display screen. For example, the media guidance application may store (e.g., on storage 308 (FIG. 3)) information describing the coordinates where a particular user typically is located (e.g., the location of a favorite chair of a user, the viewing height of a user when the user is standing/seated/reclined, the size of the display screen, etc.) information describing the display screen (the size of the display, the capabilities of the display screen), and/or any other information needed to compensate for the disability of a user (e.g., dimensions of the viewing area).

In some embodiments, the media guidance application may use this information to determine a focus area of a user (e.g., as described in relation to process 800 (FIG. 5) and focus area detection component 500 (FIG. 5)). For example, the media guidance application may determine (e.g., via control circuitry 304 (FIG. 3)) the x, y coordinates (or the x, y, z coordinates in the case of 3D displays) of the focus area (e.g., focus area 608 (FIG. 6A)) on the display screen (e.g., display 610 (FIG. 6A)).

At step 906, the media guidance application determines whether or not a user input of a disability was received. For example, the media guidance application may receive one or more user inputs identifying the disability of the user. For example, a user may enter (e.g., via display 200 (FIG. 2)) his/her disabilities and/or a measure of a disability (e.g., the effect the disability has on the focus area or a user) into an interface (e.g., via user input interface 310 (FIG. 3)) associated with the media guidance application. In some embodiments, the media guidance application may generate a profile with information about the disability of the user. For example, the media guidance application may store (e.g., on storage 308 (FIG. 3)) information describing the disability, measure of disability, and/or coordinates of an area of a particular display screen that the disability affects (e.g., as found in medical information, previous disability/vision tests performed by the media guidance application, passive monitor of the user, etc.).

If the media guidance application determines the user inputted his/her disability, the media guidance application proceeds to step 910. If the media guidance application determines the user did not input his/her disability, the media guidance application proceeds to step 908. At step 908, the media guidance application detects a disability of the user. For example, sensors (e.g., optical sensors 506 (FIG.)) may collect data related to the activities of the user and/or interactions with the media guidance application to determine a particular disability of the user such as whether or not a user tilts and/or moves his/her head during viewing (e.g., indicative of blind spots, poor peripheral vision, limited central vision, etc.), squints and/or wears glasses or has other vision corrective measures (e.g., indicative of a poor visual acuity), averts his/her eyes during particular bright portions of a media asset (e.g., indicative of a sensitivity to bright light), etc.

In some embodiments, the media guidance application may prompt the user for user inputs related to the disability and/or measure of the disability of the user. For example, the media guidance application may prompt the user to download medical information. In another example, the media guidance application may perform a vision test or other test to calibrate itself to the disability and/or measure of a disability of the user.

At step 910, the media guidance application inputs the determined disability of the user and the location of the user into a look-up table to determine a perceived distortion area on the display screen. For example, the media guidance application may cross-reference a either a local (e.g., storage 308 (FIG. 3) of user equipment device 402, 404, and/or 406 (FIG. 4)) or remote (e.g., located at content source 416, media guidance data source 418, and/or any location accessible via communications network 414 (FIG. 4)) database to determine the perceived distortion area. The coordinates of the focus area may be inputted and filtered according to the location, disability, and/or any other information indicative of an area of perceived distortion associated with the user.

At step 912, the media guidance application receives a media asset with one or more media objects. For example, as described in relation to FIG. 8 above, the media guidance application may receive (e.g., via I/O path 302 (FIG. 3)) a media asset in the form of a video (e.g., a movie). The media asset may include a series of frames. For each frame of the media asset, the media guidance application may use an object recognition module to determine the initial position of each media object. In addition, the object recognition module may assist the media guidance application in determining whether or not a particular media object is relevant (e.g., as discussed below in relation to step 924).

In some embodiments, the media guidance application may receive a single frame, scene, and/or an entire media asset. For example, in some embodiments, the media guidance application may compensate for the disabilities of a user "on the fly" by processing the media asset in real-time and/or in associated with a suitable buffer. In some embodiments, the media guidance application may receive the media asset and process and store (e.g., either locally such as on storage 308 (FIG. 3) of user equipment device 402, 404, and/or 406 (FIG. 4) or remotely such as at content source 416, media guidance data source 418, and/or any location accessible via communications network 414 (FIG. 4)) the media asset prior to a user viewing or requesting to view the media asset.

In some embodiments, the media guidance application may also search for versions of a media asset that have already been modified (either by the media guidance application or by a third party). For example, in some embodiments, the media guidance application may search for a media asset that has already been customized for a user with a particular disability (e.g., limited central vision). In some embodiments, the media guidance application may store previous media assets (e.g., at storage 308 (FIG. 3)) for later retrieval. In addition, the media guidance application may develop a profile associated with the user, which includes data on how media assets of a particular type (e.g., program grids) are typically displayed. Additionally or alternatively, the media guidance application may prompt the user as to a particular version (e.g., a previously generated version, a version from a particular source, a version generated according to particular criteria, etc.). In response to a user input responding to the prompt, the media guidance application may present an alternative version of the media asset.

The media guidance application may also assign an x, y coordinate to the media object, and at step 914 determine whether or not the initial position of the media object corresponds to the area of perceived distortion (e.g., whether or not the x, y coordinate of the media object is inside/outside the x, y coordinates of the area of perceived distortion) as described above. If the initial position of the media object is not within the area of perceived distortion, the media guidance application (e.g., via control circuitry 304 (FIG. 3)) generated the media object for display (e.g., on display 610 (FIG. 6A)) in the initial position at step 916. If the initial position of the media object is within the area of perceived distortion, the media guidance application (e.g., via control circuitry 304 (FIG. 3)) proceeds to step 918.

At step 918, the media guidance application determines whether or not to adjust the position of the media object based on the relevance of the media object. For example, if the media object is not relevant (e.g. is associated with a portion of a media asset that does not substantially affect the ability of a user to comprehend the content or context of the media asset, is associated with an interactive guide function that is unlikely to be used by the user, etc.), the media guidance application may disregard its presence in the perceived distortion area and proceed to step 922. For example, if the media object is associated with the background of the scene of a movie, the media guidance application may determine that it can disregard the presence of the media object in the perceived distortion area. It should be noted that in some embodiments, the media guidance application may not adjust the position of the media object based on the relevance of the media object and proceed to step 922 from step 914.

If the media guidance application adjusts the position of the media object based on the relevance of the media object, the media guidance application proceeds to step 920 and inputs the characteristics of media object into a look-up table to determine relevance. For example, the media guidance application may cross-reference the media object, media asset, and/or characteristics (e.g., size, shape, color, on-screen duration, associated function, etc.) of the media object/media asset in either a local (e.g., storage 308 (FIG. 3) of user equipment device 402, 404, and/or 406 (FIG. 4)) or remote (e.g., located at content source 416, media guidance data source 418, and/or any location accessible via communications network 414 (FIG. 4)) database associated with the relevance of a media object to determine whether or not the media object is relevant at step 924. If the media object is relevant, the media guidance application proceeds to step 922. If the media object is not relevant, the media guidance application proceeds to step 926 and generates the media object for display (e.g., on display 610 (FIG. 6A)) in the initial position.

In some embodiments, a user may define the media objects or the type of media objects that are relevant. For example, a user may indicate that menu icons are relevant, but that advertisements are not relevant. In addition, the media guidance application may store (e.g., on storage 308 (FIG. 3)) previous decisions by the user as to the media objects that are relevant. The media guidance application may use this information to recommend future positions or layouts of media objects.

At step 922, the media guidance application determines whether or not any other positions are available for the media object. For example, after the media guidance application determines (e.g., via control circuitry 304 (FIG. 3)) a first set of coordinates on the display screen associated with the initial position (e.g., the position of media object 602 in FIG. 6A), and a set of coordinates associated with an area of perceived distortion (e.g., perceived distortion area 606 (FIG. 6A)), the media guidance application searches for a second set of coordinates associated with a second position on the display screen (e.g., the position of media object 602 in FIG. 6C) that does not correspond to the set of coordinates associated with the area of perceived distortion.

If the media guidance application determines that there are other positions available for the media object, the media guidance application proceeds to step 930 and generates the media object for display in the available position. If the media guidance application determines that there are not any other positions available for the media object, the media guidance application proceeds to step 928 and generates the media object for display in the initial position. Additionally or alternatively, the media guidance application may determine that a different media asset should be presented in response to determining that there are not any other positions available for the media object. For example, if the media guidance application determines that a particularly relevant media object cannot be displayed, then the media guidance application may search for, or prompt the user to find, a different media asset. In some embodiments, the media guidance application may also determine the number of media objects (e.g., in a frame, scene, and/or entire media asset) with initial positions in the area of perceived distortion that cannot be displayed in an alternative position. If the number is above a particular threshold number, the media guidance application may search for, or prompt the user to find, a different media asset.

At step 932, the media guidance application determines whether or not there are any additional media objects (e.g., in the frame, scene, and/or the entire media asset). If there are additional media objects the media guidance application returns to step 932. If there are no more media objects, the media guidance application generates the media asset with the media objects at step 934.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:
1. A method of arranging media objects on display screens to compensate for disabilities of users, the method comprising:
monitoring, using control circuitry, user inputs, associated with media assets, of a user to generate a user profile;

cross-referencing, using the control circuitry, the user profile with a database associated with measures for disabilities to determine a measure of a disability of the user;
determining, using the control circuitry, a first set of coordinates on a display screen, wherein the first set of coordinates defines an area of the display screen that is perceived as being distorted by the user based on the measure of disability of the user;
receiving, using the control circuitry, a media asset over a communication network with a media object at a first position on the display screen;
determining, using the control circuitry, whether the first set of coordinates corresponds to the first position;
in response to determining the first set of coordinates corresponds to the first position, determining, using the control circuitry, a second position on the display screen that is not perceived as being distorted by the user with the disability; and
generating, using the control circuitry, the media object at the second position on the display screen.

2. The method of claim 1, wherein determining the first set of coordinates on the display screen, further comprises:
determining a viewing location of the user relative to the display screen; and
determining a focus area of the user based on the viewing location, wherein the focus area includes the display screen.

3. The method of claim 2, wherein determining the first set of coordinates on the display screen, further comprises:
determining a measure of a disability of a user;
determining a perceived distortion of the focus area based on the measure of a disability of a user.

4. The method of claim 3, wherein determining the first set of coordinates on the display screen, further comprises:
determining an overlap of the perceived distortion and the display screen; and
determining coordinates associated with the overlap.

5. The method of claim 4, wherein determining the focus area of the user based on the viewing location, further comprises:
determining a distance of the user from the focus area;
determining a viewing trajectory associated with the user; and
calculating a geometrical area of the focus area based on the distance of the user from the focus area and the viewing trajectory associated with the user.

6. The method of claim 5, wherein determining whether the first set of coordinates corresponds to the first position, further comprises determining whether the first position is included in the overlap.

7. The method of claim 1, further comprising, in response to determining that the media object cannot be generated at the second position on the display screen, presenting an alternative media asset.

8. The method of claim 1, further comprising:
determining a size associated with the media object relative to the display screen; and
in response to generating the media object at the second position on the display screen, adjusting the size associated with the media object.

9. The method of claim 1, wherein determining the first set of coordinates on the display screen comprises determining coordinates for a user blind spot on the display screen.

10. A system of arranging media objects on display screens to compensate for disabilities of users, the system comprising control circuitry configured to:
monitor user inputs, associated with media assets, of a user to generate a user profile;
cross-reference the user profile with a database associated with measures for disabilities to determine a measure of a disability of the user;
determine a first set of coordinates on a display screen, wherein the first set of coordinates defines an area of the display screen that is perceived as being distorted by the user based on the measure of disability of the user;
receive a media asset over a communication network with a media object at a first position on the display screen;
determine whether the first set of coordinates corresponds to the first position;
in response to determining the first set of coordinates corresponds to the first position, determine a second position on the display screen that is not perceived as being distorted by the user with the disability; and
generate the media object at the second position on the display screen.

11. The system of claim 10, wherein the control circuitry configured to determine the first set of coordinates on the display screen is further configured to:
determine a viewing location of the user relative to the display screen; and
determine a focus area of the user based on the viewing location, wherein the focus area includes the display screen.

12. The system of claim 11, wherein the control circuitry configured to determine the first set of coordinates on the display screen is further configured to:
determine a measure of a disability of a user;
determine a perceived distortion of the focus area based on the measure of a disability of a user.

13. The system of claim 12, wherein the control circuitry configured to determine the first set of coordinates on the display screen is further configured to:
determine an overlap of the perceived distortion and the display screen; and
determine coordinates associated with the overlap.

14. The system of claim 13, wherein the control circuitry configured to determine the focus area of the user based on the viewing location is further configured to:
determining a distance of the user from the focus area;
determining a viewing trajectory associated with the user; and
calculating a geometrical area of the focus area based on the distance of the user from the focus area and the viewing trajectory associated with the user.

15. The system of claim 14, wherein the control circuitry configured to determine whether the first set of coordinates corresponds to the first position is further configured to determine whether the first position is included in the overlap.

16. The system of claim 10, further comprising control circuitry configured to present an alternative media asset in response to determining that the media object cannot be generated at the second position on the display screen.

17. The system of claim 10, further comprising control circuitry configured to:
determine a size associated with the media object relative to the display screen; and
in response to generating the media object at the second position on the display screen, adjust the size associated with the media object.

18. The system of claim 10, wherein the control circuitry configured to determine the first set of coordinates on the display screen further comprises control circuitry configured to determine coordinates for a user blind spot on the display screen.

\* \* \* \* \*